3,131,209
PREPARATION OF ISOPHTHALONITRILES AND TEREPHTHALONITRILES
Henry L. King, Cary, N.C., assignor, by mesne assignments, to Monsanto Chemical Company, a corporation of Delaware
No Drawing. Filed Sept. 11, 1961, Ser. No. 137,065
5 Claims. (Cl. 260—465)

This invention relates to the preparation of phthalonitriles and more especially to the production of isophthalonitriles and terephthalonitriles from isophthalic and terephthalic acids or their nitrile-forming derivatives.

It is known in the prior art that aromatic acids, anhydrides, amides, imides and other derivatives can be converted to the corresponding nitriles by reaction with ammonia in the vapor phase over a dehydrating catalyst, according to the following reactions:

$$RCOOH + NH_3 \rightarrow RCN + 2H_2O$$
$$R(COOH)_2 + 2NH_3 \rightarrow R(CN)_2 + 4H_2O$$

wherein R is an organic residue.

The aliphatic nitriles and one aromatic nitrile; namely, ortho-phthalonitrile, can be conveniently prepared in accordance with the foregoing method from the appropriate aromatic acid or nitrile-forming derivatives thereof because of the generally low boiling and melting points of these starting materials. However, this prior art method has not been suitable for use in the preparation of isophthalonitrile or terephthalonitrile. The reason for this is the extraordinary heat stability of isophthalic and terephthalic acids which makes their nitrile derivatives so useful in the production of fiber-forming linear polymers. That is, the boiling points and melting points of isophthalic and terephthalic acids are so high that the heat required to render them fluid, either in molten or vapor form preparatory to introducing them into the catalytic reaction zone, inevitably results in decomposition.

It is therefore an object of this invention to prepare isophthalonitriles and terephthalonitriles in liquid phase at relatively low temperatures.

It is a further object of this invention to convert isophthalic and terephthalic acids to the corresponding nitriles in an inert liquid reaction medium in which the acid is partially soluble at 150° C.

The foregoing and other objects of this invention will become apparent as the following description thereof proceeds.

In accordance with this invention, a typical preparation of isophthalonitrile or terephthalonitrile is conducted as follows: Isophthalic or terephthalic acid is first admixed with a conventional dehydrating catalyst and sufficient adiponitrile to form a slurry at room temperature. The mixture is then heated with continuous stirring, during which time ammonia is continuously introduced therein. After the temperature reaches a level of between about 200° to 250° C., most, if not all, of the solids will have dissolved into a homogeneous solution. At this temperature the phthalonitrile product together with the adiponitrile solvent and water begin to distill over. The solid phthalonitrile product is easily recovered from the distillate by simple filtration and is thereafter washed with alcohol to remove impurities. The adiponitrile is readily recovered from the filtrate for reuse.

In addition to the phthalic acid starting materials already mentioned, others may also be employed. Suitable are nitrogen compounds intermediate between the isophthalic and terephthalic acids and their nitriles, such as the mono- and diammonium salts of isophthalic and terephthalic acids, isophthalic and terephthalic mono- and diamides, m-cyanobenzoic acid, p-cyanobenzoic acid, m-cyanobenzoic amide, p-cyanobenzamide, ammonium m-cyanobenzoate, ammonium p-cyanobenzoate, and the ammonium salts of isophthalic monoamide and terephthalic monoamide.

The dehydrating catalysts employed in the reaction are known to the art and have been described in such tests as "Catalysis" by Berkman, Morrell and Egloff. While phosphoric acid and fused mixed oxides of boron and phosphorus are preferred, other catalysts which are also very satisfactory include oxides of zirconium, beryllium, tungsten and vanadium and basic aluminum phosphate and basic aluminum sulfate. The catalyst may be in either fluid or fixed beds. Supports such as alundum and the like, may be employed in the case of fixed beds.

The amount of adiponitrile solvent should be sufficient to permit the desired stirring of the reaction mixture, but is otherwise not critical. However, a substantial excess is not desirable since the volume of vapors to be handled is thereby unnecessarily increased, resulting in the need for larger equipment and greater operating costs.

In addition to ammonia, urea may also be employed for effecting the conversion of isophthalic or terephthalic acid or the other noted starting materials to the corresponding nitriles.

The following examples will serve to further illustrate the invention in greater detail, but it will be understood that they are presented for illustrative purposes only and the invention is not to be limited thereby. Parts are given by weight unless otherwise indicated.

Example I

In a reaction vessel of stainless steel or other resistant material, 200 parts of terephthalic acid are mixed with 250 parts of adiponitrile and about 5 parts of a dehydrating catalyst consisting of 85 percent orthophosphoric acid. The resulting slurry is heated with continuous stirring, during which time gaseous ammonia is introduced into the slurry by means of a gas inlet tube. As the temperature reaches about 150° C., water of reaction begins to distill over. At temperatures of from about 200° to 250° C., the solid phase disappears and the solution becomes substantially homogeneous. At these temperatures a distillate containing adiponitrile and terephthalonitrile along with the water of reaction comes over. After all the water has been distilled, the distillation of the terephthalonitrile product and the adiponitrile solvent is completed by raising the temperature to about 350° C.

The terephthalonitrile solid product is readily separated from the adiponitrile-water condensate by filtration. The adiponitrile layer of the filtrate is separated by decantation from the aqueous layer and the recovered adiponitrile may be reused in further production. The purification of the terephthalonitrile product is carried out by first washing with ethanol followed by crystallization from dimethyl formamide. The product yields are from 60 to 68 percent. The terephthalonitrile obtained had a melting point of 224° C.

Example II

A reaction flask is charged with 200 parts of terephthalic acid, 200 parts of urea, and 5 parts of a dehydration catalyst consisting of fused oxides of boron and phosphorus oxides ground to pass a 40 mesh screen. 500 parts of adiponitrile are then added and the mixture is stirred to a smooth slurry. Gaseous ammonia is introduced as a sweep gas and the stirred slurry is slowly heated to about 260° C. over a period of about 4 hours. At this temperature the crude terephthalonitrile product begins to distill over and is collected in a suitable condensate receiver. Distillation is continued as the temperature is slowly raised being complete at about 350° C.

The distillate is then filtered to separate the terephthalonitrile as a white solid product which is washed with ethanol and dried in a vacuum oven. The washed and dried terephthalonitrile had a melting point of 223° C. to 224° C. The product yield was 63.5 percent.

*Example III*

A mixture of 200 parts of isophthalic acid, 200 parts of urea and 5 parts of a catalyst consisting of fused oxides of boron and phosphorus in 500 parts of adiponitrile was treated in accordance with the procedure as set out in Example II above. Distillation began at about 285° C. and continued to a temperature of about 297° C. After isolation of the product by filtration, the crude isophthalonitrile was washed with ethanol and thereafter recrystallized from methanol. There was obtained 94.5 parts of isophthalonitrile which represented a yield of 61.5 percent. The isophthalonitrile recovered had a melting point of from 159° C. to 160° C.

Obviously, there are many changes and modifications which can be made with respect to the preferred embodiments of this invention as presented above. For example, different catalysts may be employed as well as different nitrile-forming starting materials, a number of which have been discussed herein. Therefore, it is intended to cover all changes and modifications of the specific examples selected for the principles of illustration which are within the scope of the invention as defined by the appended claims.

I claim:

1. A method for preparing a phthalonitrile which comprises mixing one compound from the group consisting of isophthalic acid, terephthalic acid, m-cyanobenzoic acid, p-cyanobenzoic acid, and their ammonium salts, monoamides and diamides in a reaction medium of adiponitrile, reacting said compound with a member of the group consisting of ammonia and urea in the presence of a dehydrating catalyst while maintaining a temperature within the range of 150° to 350° C., withdrawing the vaporous effluent comprising phthalonitrile and adiponitrile from said reaction, condensing said effluent and recovering the solid phthalonitrile from the condensed effluent.

2. A method for preparing terephthalonitrile which comprises passing a stream of ammonia through a mixture of terephthalic acid in adiponitrile at a temperature within the range of about 150° to 250° C. in the presence of phosphoric acid, passing the resulting vaporous effluent through a condensing zone, cooling said effluent to condense adiponitrile as a liquid and terephthalonitrile as a crystalline solid, filtering said condensate to separate the solid terephthalonitrile, washing the filter cake of terephthalonitrile crystals, and recovering the terephthalonitrile product.

3. A method for preparing phthalonitriles which comprises forming a slurry in adiponitrile of urea and one compound from the group consisting of isophthalic acid, terephthalic acid, m-cyanobenzoic acid, p-cyanobenzoic acid and their ammonium salts, monoamides and diamides, heating said slurry to a temperature in the range of 260° to 350° C. in the presence of a dehydration catalyst, passing the resulting effluent vapors to a condensing zone, cooling said effluent vapors in said condensing zone to form a crude condensate comprising phthalonitrile and recovering said phthalonitrile product.

4. A method for preparing terephthalonitrile which comprises forming a slurry in adiponitrile of urea and terephthalic acid, heating said slurry to a temperature in the range of 260° to 350° C. in the presence of fused mixed oxides of boron and phosphorus, passing the resulting effluent vapors to a condensing zone, cooling said effluent vapors in said condensing zone to form a crude condensate comprising terephthalonitrile and recovering said terephthalonitrile product.

5. A method for preparing isophthalonitrile which comprises forming a slurry in adiponitrile of urea and isophthalic acid, heating said slurry to a temperature in the range of 260° to 350° C. in the presence of fused mixed oxides of boron and phosphorus, passing the resulting effluent vapors to a condensing zone, cooling said effluent vapors in said condensing zone to form a crude condensate comprising isophthalonitrile and recovering said isophthalonitrile product.

References Cited in the file of this patent

UNITED STATES PATENTS

| 2,200,734 | Arnold et al. | May 14, 1940 |
| 2,525,620 | Scalera et al. | Oct. 10, 1950 |

FOREIGN PATENTS

| 829,251 | Great Britain | Mar. 2, 1960 |